United States Patent [19]

Sato et al.

[11] Patent Number: 4,484,796
[45] Date of Patent: Nov. 27, 1984

[54] OPTICAL FIBER CONNECTOR

[75] Inventors: Hidemi Sato; Aizo Kaneda, both of Yokohama; Hitoshi Yokono, Katsuta; Atsuyoshi Ohashi, Chigasaki; Kiyohide Miyake, Kodaira; Toshiro Kodama, Hachioji; Kiichi Suzuki, Yokosuka, all of Japan

[73] Assignee: Hitachi, Ltd., Tokyo, Japan

[21] Appl. No.: 319,986

[22] Filed: Nov. 10, 1981

[30] Foreign Application Priority Data

Nov. 11, 1980 [JP] Japan ................................. 55-157583
May 29, 1981 [JP] Japan ................................... 56-81012

[51] Int. Cl.$^3$ ................................................ G02B 7/26
[52] U.S. Cl. .................................................. 350/96.21
[58] Field of Search ....................... 264/1.5; 350/96.20, 350/96.21, 96.22; 425/808

[56] References Cited

U.S. PATENT DOCUMENTS

| 4,107,242 | 8/1978 | Runge | 264/1.5 |
| 4,173,389 | 11/1979 | Curtis | 350/96.20 |
| 4,330,171 | 5/1982 | Malsot et al. | 350/96.21 |
| 4,362,356 | 12/1982 | Williams et al. | 350/96.20 |
| 4,365,037 | 12/1982 | Adachi et al. | 524/449 |

FOREIGN PATENT DOCUMENTS

| 1702 | 5/1979 | European Pat. Off. |  |
| 8941 | 3/1980 | European Pat. Off. |  |
| 2456151 | 8/1976 | Fed. Rep. of Germany | 350/96.21 |
| 55451 | 5/1979 | Japan | 350/96.20 |
| 157635 | 12/1979 | Japan | 350/96.20 |
| 120008 | 9/1980 | Japan | 264/1.5 |
| 89709 | 7/1981 | Japan | 350/96.20 |

OTHER PUBLICATIONS

Suzuki et al., *Review of Elect. Comm. Laboratories*, vol. 27, No. 11, Nov./Dec. 1979, "Demountable Connectors for Optical Fiber Transmission Equipment", pp. 999–1009.

*Primary Examiner*—William L. Sikes
*Assistant Examiner*—Frank González
*Attorney, Agent, or Firm*—Antonelli, Terry & Wands

[57] ABSTRACT

An optical fiber connector comprising a pair of plugs, a sleeve and a pair of cap nuts which is assembled at the site where optical fibers are installed, so as to connect the optical fibers with a high degree of positional accuracy. The plugs and the sleeve are molded of a composition including a synthetic resin added with a suitable content of a filler, such as glass beads.

9 Claims, 9 Drawing Figures

OPTICAL FIBER CONNECTOR

BACKGROUND OF THE INVENTION

This invention relates to an optical fiber connector for connecting optical fibers together which are used as fiber-optic links in an optical communications system and a method of producing same.

An optical information transmitting system or optical communications system has been developed as a promising system that would take over the electrical information transmitting system now widely in use. In an optical communications system, pulses of light generated on the transmission side are transmitted down fibers of glass or optical fibers of a thickness of one hundred to several hundreds of μm to the receiving side at which the pulses of light are converted into electric signals and taken out.

In this type of optical communications system, the most important problem is how to transmit information from the transmission side to the receiving side with a high degree of efficiency in a stable manner.

In the optical communications system, a loss of light would occur in the connections of optical fiber connectors for connecting together the optical fibers forming links and built into telephone trunk networks, for example, for transmitting signals. Advances made in the progress of the art have made it possible to reduce the loss occurring within the optical fibers to the range between a fraction of and 1 dB/km. In the optical fiber connectors, however, the loss that might occur has its size decided by the amount of eccentricity of the axes of a pair of optical fibers abutted against each other by an optical fiber connector. For example, in the case of an optical fiber of 125 μm in diameter, if the axes of the optical fibers abutted against each other are off-center by about 4 μm, a connection loss of about 0.5 dB would occur; if the eccentricity is about 7 μm, the loss would be 1 dB.

Thus the present practice in transmitting information over a long distance by utilizing an optical communications system is to mount repeaters in the fiberoptic links at suitable intervals of space for amplifying signals that have been attenuated, before being transmitted to the destination. In this case, if the connection loss occurring in the optical fiber connectors is high, it would become necessary to increase the number of repeaters. An increase in the number of repeaters is not only undesirable from the economical point of view but also gives rise to many problems because it makes it necessary to perform maintenance and inspection more often and might reduce the reliability of the optical communications system as a whole.

The optical fibers may vary from one another in length depending on the locations at which they are installed or the channels through which information is transmitted. Thus the operation of attaching a connector to the terminal ends of the optical fibers has been required to be performed readily at the site of installation.

Accordingly the optical fiber connector should meet the requirements of low connection loss and easy assembly.

The optical fiber connector usually comprises a plug formed with a flange in an intermediate portion on its outer peripheral surface and a bore for containing an optical fiber in its center axial portion, a sleeve formed at its center axis with a through hole for fitting the outer peripheral surface of the plug and on its outer peripheral surface with threads, a cap nut adapted to threadably engage the thread generated in the sleeve, and a spring mounted between the plug and the cap nut for keeping constant the abutting force exerted by the plug. The accuracy in positioning an optical fiber owes largely to the accuracy in positioning the plug and sleeve relative to each other. In this respect, what is most important is how to minimize deviation of the axis of the plug from the axis of the optical fiber.

To this end, two types of plugs have hitherto been developed. One type has its outer case formed of hard metal which has a double eccentric cylinder built therein and the other type has a guide of jewels or ceramics embedded in the center axis and formed with a bore of a diameter slightly greater than that of the optical fiber.

In the plug of the type having the double eccentric cylinder, positioning of the optical fiber with respect to the center axis of the plug is effected by moving the two eccentric cylinders while making observations with a microscope after the optical fiber is fixed to the eccentric cylinders in the central portion of the plug. Thus this type has the disadvantage of being very poor in operability.

The plug having a guide embedded therein has the forward end of the optical fiber positioned by the guide, so that this type offers the advantage of the operability at the site of installation being greatly improved. However, working of the plug or aperturing the guide on the order of a fraction of millimeter would require highly advanced skills and a prolonged time for consummation, so that the operation would be very low in productivity.

SUMMARY OF THE INVENTION

An object of this invention is to provide an optical fiber connector enabling optical fibers to be assembled readily and with a high degree of precision at the site of installation at which connection of optical fibers is required to be effected.

Another object is to provide a method of producing an optical fiber connector enabling the optical fiber connector to be assembled readily and with a high degree of precision at the site of installation.

The aforesaid objects are accomplished according to the invention by providing the features that the sleeve and the plug constituting an optical fiber connector are molded of the same synthetic resin and that when the plug is shaped, the bore for receiving an optical fiber is molded by a projection on an end surface of the core pin constituting the abutting end of the plug.

DESCRIPTION OF THE PREFERRED EMBODIMENTS

Figure 1:
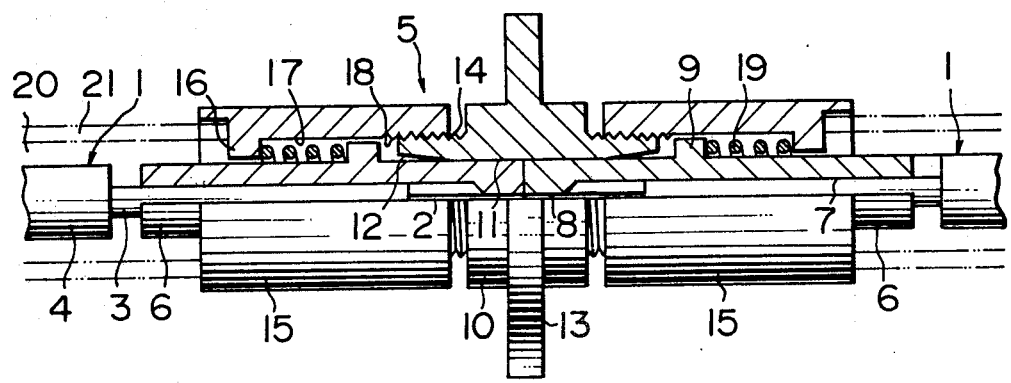
FIG. 1 is a front view, with certain parts being shown in section, of the optical fiber connector comprising one embodiment of the invention.

Preferred embodiments of the invention will now be described by referring to the accompanying drawings. FIG. 1 shows an optical fiber connector 5 comprising one embodiment of the invention being used for connecting optical fibers. An optical fiber cable 1 comprises an optical fiber 2 for transmitting light signals, a primary coat 3 for reinforcing the optical fiber 2, and a secondary coat 4 overlying the primary coat 3. The optical fiber connector 5 includes a plug 6 molded cylindrically in such a manner that a bore 7, for receiving and end portion of the optical fiber cable 1 from which the secondary coat 4 is removed, and an orifice 8, for receiving the optical fiber 2 from which coat 3 is also removed communicate with each other in the center axis of the plug 6. A flange 9 is formed in the central portion of the outer peripheral surface of the plug 6. A sleeve 10 has a through hole 11 molded therein for receiving the plug 6. Hole 11 has divergingly tapering guide portions 12 located at opposite ends and diverging toward the openings of the hole. The sleeve 10 is molded on its outer peripheral surface with a flange 13 in the central portion and threads 14 at either end. A cap nut 15 is molded cylindrically and has a through hole 17 molded therein which slidably receives the plug 6 and has a flange 16 located opposite the flange 9. The through hole 17 is molded at one end with threads 18 for engaging the threads 14 molded in the sleeve 10. A spring 19 is attached to the outer periphery of the plug 6 so as to be interposed between the flanges 9 and 16. The plug 6 and the secondary coat 4 of the optical fiber cable 1 are connected together as a unit by a clamp ring 20 and a cable cap 21, so as to avoid an inserting and withdrawing force being exerted on the optical fiber 2 when the plug 6 is inserted and withdrawn with respect to the sleeve 10.

In the aforesaid construction, the optical fiber container 5 is assembled as follows. The optical fiber cable 1, plug 6, sleeve 10, cap nut 15, spring 19, clamp ring 20 and cable cap 21 are molded in the respective shapes at the plant and transported to the site of installation individually. At the site of installation, the cable cap 21, clamp ring 20, cap nut 15 and spring 19 are inserted in the indicated order in the end of the optical fiber cable 1 and moved to the position where they do not interfere with operations. Then, after removing the secondary coat 4 and the primary coat 3 from the end of the optical fiber cable 1 to a position spaced apart from the end by a predetermined length, the optical fiber 2 of the optical fiber cable 1 that has had sheaths is washed with an organic solvent. Meanwhile an adhesive agent is inserted in suitable amount into the bore 7 and orifice 8 of the plug 6. Then the optical fiber cable 1 is inserted at one end into the bore 7 of the plug 6 and forced thereinto until the optical fiber 2 projects from the orifice 8 a suitable length. Following setting of the adhesive agent, the forward end portion of the plug 6 is fixed and the cap nut 15 is moved toward the front end of the plug 6 as long as the spring 19 is compressible, to be locked therein. Thereafter, the clamp ring 20 is positioned such that one end thereof is applied to the plug 6 and the other end thereof is applied to the secondary coat 4 of the optical fiber cable 1, and the clamp ring 20 is adhesively attached to the plug 6 and the secondary coat 4. In like manner, the cable cap 21 is adhesively attached to the secondary coat 4. Then, the cap nut 15 is released and returned toward the center of the optical fiber cable 1 by the biasing force of the spring 19. The portion of the optical fiber 2 projecting from the forward end of the plug 6 is severed so that the optical fiber 2 will match the plug 6 at their ends. The plug 6 is inserted in a jig for lapping to grind the forward end portion of the plug 6. After it is subjected to lapping until a required surface roughness is attained, the plug 6 and the optical fiber 2 have their surfaces washed. Then, the plug 6 is fitted in the sleeve 10 and clamped by the cap nut 15, thereby completing connection of the optical fiber cable 1 by the optical fiber connector 5.

The bore 7 of the plug 6 and the space between the optical fiber 2 and the primary coat 3 as well as the space between the orifice 8 and the optical fiber 2 are filled with an adhesive agent.

The sleeve 10 and the cap nut 15 of the optical fiber connector 5 are molded by a shaping process known in the art.

Figure 2:
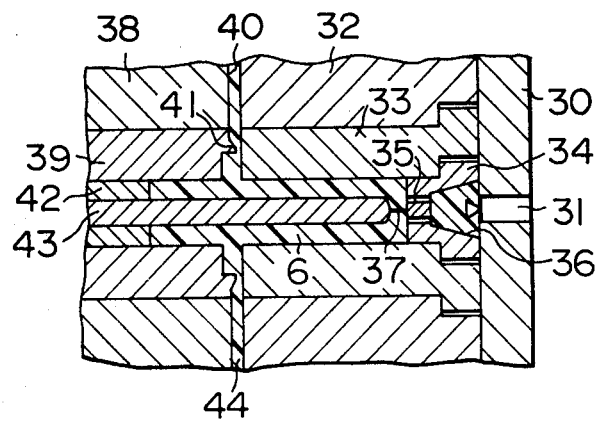
FIG. 2 is a sectional front view showing the essential portions of a mold for molding a plug.

The plug 6 is molded with a mold shown in FIG. 2 in its essential portions only. The portions of the mold not shown are similar to those of a known mold of the triad construction.

Referring to FIG. 2, a lock pin 31 projects from a stationary mounting plate 30, and a stationary cavity retainer plate 32 has a stationary cavity 33 for defining the outer periphery of the forward end portion of the plug 6 embedded therein and having at one end thereof a stationary core 34 defining the forward end face of the plug 6 embedded therein. The stationary core 34 is formed therein with air vents 35 for evacuating a cavity for defining the plug 6, and a dummy cavity 36 communicating with the air vents 35 and storing therein the air from the aforesaid cavity. A stationary core pin 37 slightly thicker than the optical fiber 2 of the optical fiber cable 1 projects from the end face of the stationary core 34 at its central portion. A movable cavity retainer plate 38 has embedded therein a movable cavity 39 for defining the flange 9 of the plug 6 and the outer periphery of the rear end thereof. The movable cavity retainer plate 38 and the movable cavity 39 have a groove 40 of the disc shape formed therein for providing a runner of the disc shape between the movable cavity retainer plate 38 and the stationary cavity retainer plate 32, and an annular gate is provided between an annular projection 41 formed on the movable cavity 39 and the stationary cavity retainer plate 32. The movable cavity 39 has an ejector pin 42 slidably inserted therein for defining the rear end face of the plug 6. The ejector pin 42 has slidably inserted in its center axis a movable core pin 43 having a diameter larger than the outer diameter of the secondary coat 4 of the optical fiber cable 1, so that when the mounting plates are clamped together the forward end of the movable core pin 43 abuts against the stationary core pin 37.

In this construction, when the mounting plates are clamped together and a synthetic resin 44 is fed from a molding machine to the runner, the synthetic resin 44 flows into the cavity defined by the stationary cavity 33, stationary core 34, stationary core pin 37, movable cavity 39, movable core pin 43 and ejector pin 42 after passing through the gate following filling of the runner, to form the plug 6. At this time, the air failed to be released through the interface between the mounting plates and gaps between the parts flows through the air vents 35 to be forced into the second cavity. After the resin has set, the mounting plates are released from each other. First of all, the movable cavity retainer plate 38 is moved rearwardly. This moves the molded plug 6 together with the movable cavity retainer plate 38. At this time, the synthetic resin in the air vents 35 is ruptured, to separate the plug 6 from the synthetic resin in the second cavity. Rearward movement of the movable cavity retainer plate 38 actuates the ejector pin 42 which ejects the plug 6 from the movable cavity 39 and the stationary core pin 37. At the same time, the stationary cavity retainer plate 32 moves together with the movable cavity retainer plate 38, to be separated from the stationary mounting plate 30. Then the synthetic resin set in the second cavity catches against the lock pin 31 and remains on the stationary mounting plate 30, so that the synthetic resin set in the air vents 35 and the dummy cavity 36 of the stationary core 34 can be removed. While the parts are in this condition, the synthetic resin that has set is removed from the lock pin 31.

By molding the plug 6 by using a core pin attached to the core for defining the forward end face of the plug 6 for molding the orifice 8 for receiving the optical fiber 2 of the optical fiber cable 1, it is possible to achieve positioning of the orifice 8 with respect to the plug 6 with a very high degree of precision. The provision of the second cavity is conducive to increase dimensional accuracy of the forward end portion of the plug 6.

The plug 6 may be molded of either a thermosetting resin or thermoplastic resin. When a synthetic resin is used singly, the hardness thereof is very low with respect to the optical fiber 2 of the optical fiber cable 1. The result of this would be that the length of the optical fiber 2 sticking out of the end face of the plug 6 would be large when the end face of the plug 6 is lapped. To cope with this situation, a filler of inorganic material may be added to the synthetic resin to increase the hardness of the plug 6. The filler may be selected from the group consisting of glass beads, glass balloon, volcanic glass, metals, such as aluminum, iron, etc., and their oxides, graphite and calcium carbonate.

EXAMPLE 1

Figure 3:
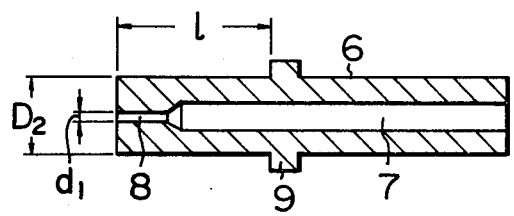
FIG. 3 is a sectional view of the plug.
Figure 4:
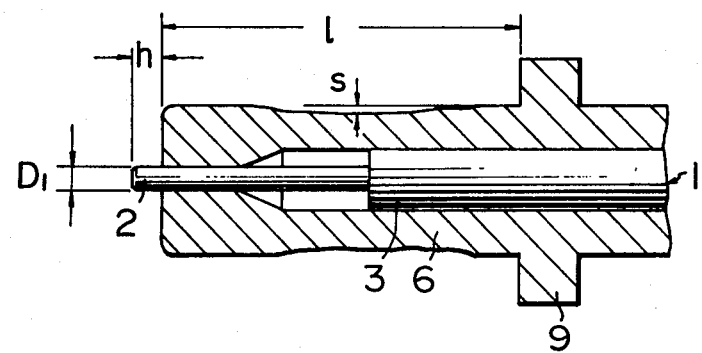
FIG. 4 is a section view of a plug with an optical fiber cable assembly therein, on an enlarged scale.

The plug 6 was molded by using a mold shown in FIG. 2 and tested for its dimensions and connection characteristics as shown in FIGS. 3 and 4, to pass judgement on whether or not the plug 6 is acceptable for specifications. Polycarbonate which is commercially available was used as the synthetic resin and the filler was selected from the group consisting of glass fibers, carbon fibers and glass beads of a mean particle size of 10 μm.

Tests were conducted on the plug pin 6 to determine its characteristics as follows:
 (1) Out of roundness or circularity of the forward end portion of plug 6 (circularity of left end portion in FIG. 3).
 (2) Concentricity (amount of eccentricity) of the center axis of orifice 8 with respect to the center axis of plug 6 (in FIG. 3, a displacement of the center axis of the outer circumference of plug 6 at its left end face from the center axis of orifice 8).
 (3) Straightness of plug 6 (measured as a maximum value of shrinkage S occurring between flange 9 and the forward (left) end of plug 6 for a length 1 (FIG. 4)); and
 (4) Surface roughness of plug 6 (coarseness of cylindrical surface of end plug 6, at left in FIG. 3).

Then, the optical fiber 1 was assembled with the plug 6, shown in FIG. 3, and its forward end ground to produce the assembly shown in FIG. 4. Thereafter, tests were conducted on the assembly of plug 6 and optical fiber cable 1 as follows:
 (5) Difference in level h (FIG. 4) between the forward end face of plug 6 and the forward end of optical fiber 2; and
 (6) Connection loss of optical fiber connector 5.

The standards by which judgment was passed were connection loss of below 1 dB and the distance between the end face of plug 6 and the end of optical fiber 2 of below 4 μm at the maximum. The results of the tests are shown in Table 1. The connection loss shown in Table 1 (and Tables 2-4) was determined with a fitting clearance O between plug 6 and sleeve 10.

TABLE 1

| | Filler | | Dimensional Accuracy (μm) | | | | Spacing between Ends of Plug and Optical Fiber | | | |
| --- | --- | --- | --- | --- | --- | --- | --- | --- | --- | --- |
| Specimen | Kind | Content (%) | Out of Roundness | Concentricity | Straightness | Surface Roughness | Mean Value | Variations | Connection Loss (dB) | Overall Results |
| A | | 0 | 2.8 | 4.5 | 5.8 | 1.8 | 14.5 | 2-18 | 1.1 | Poor |
| B | Glass Fibers | 30.0 | 14.8 | 6.5 | 8.5 | 6.0 | 4.0 | 2-7 | 1.1 | Poor |
| C | Carbon Fibers | 30.0 | 8.2 | 7.6 | 13.5 | 5.4 | 4.5 | 3-8 | 1.5 | Poor |
| 1 | Glass Beads | 2.5 | 2.8 | 3.5 | 5.6 | 1.8 | 13.0 | 2-15 | 0.95 | Poor |
| 2 | " | 4.7 | 2.9 | 3.4 | 5.5 | 1.9 | 10.5 | 3-13 | 0.95 | Poor |
| 3 | " | 5.2 | 2.9 | 3.4 | 5.5 | 1.8 | 4.5 | 2-5 | 0.85 | Poor |
| 4 | " | 9.5 | 3.0 | 2.9 | 5.4 | — | 3.5 | 2-4 | 0.80 | Excellent |
| 5 | " | 15.6 | — | 2.9 | 4.5 | 1.9 | 3.0 | 1-4 | 0.50 | Excellent |
| 6 | " | 25.0 | 3.1 | 2.3 | 3.0 | 2.2 | 2.0 | 1-3 | 0.70 | Excellent |
| 7 | " | 30.2 | 3.2 | 2.1 | 2.5 | 2.3 | 1.5 | 0-2 | 0.65 | Excellent |

In Table 1, it will be seen that the mixture of polycarbonate with 9.5-30.2 wt% of glass beads as a filler is suitable for producing an optical fiber connector. Besides glass beads, glass bulbs or silica glass may be used as a filler.

It has been ascertained that when glass beads were added in over 30-odd %, the plug 6 produced showed deterioration in mechanical properties or molding of the plug 6 was made impossible.

It is essential that the glass beads be uniformly distributed in the polycarbonate when the mixture is produced. Thus in actual practice, the proportion of the glass beads added to the polycarbonate is preferably 10–30%.

Meanwhile when the optical fiber connector 5 is in service, the plug 6 is repeatedly inserted into and withdrawn out of the sleeve 10. In applications where the number of times of insertion and withdrawing is large, it is desired that the wear caused between the plug 6 and sleeve 10 be minimized. To this end, of all lubricants, polytetrafluoroethylene (PTFE) and molybdenum disulfide ($MoS_2$) were mixed and the results of lubrication achieved by using the mixture were determined.

In addition to the subjects of tests described hereinabove with respect to the plug 6 molded of the mixture of polycarbonate and a filler, the connection loss was tested following insertion and withdrawing performed for 200 times. To the standards of judgment described hereinabove, a connection loss of less than 0.2 dB following the insertion and withdrawing of 200 times was added for the connection loss occurring in initial periods.

The mixture used for molding the plug 6 contained polycarbonate and 30 wt% of glass beads.

The results of the test are shown in Table 2.

TABLE 2

| Specimen | Filler Kind | Filler Content (%) | Dimensional Accuracy (μm) Out of Roundness | Concentricity | Straightness | Surface Roughness | Variation Spacing between Ends of Plug and Optical Fiber | Connection Loss (dB) Initial Stage | Connection Loss (dB) After Insertion and Withdrawing | Overall Results |
|---|---|---|---|---|---|---|---|---|---|---|
| A |  | 0 | 2.8 | 4.5 | 5.8 | 1.8 | 2–18 | 1.10 | 1.45 | Poor |
| 8 | PTFE | 2.5 | 2.8 | 2.1 | 5.0 | 1.8 | 0–2 | 0.65 | 1.00 | Poor |
| 9 | " | 4.2 | — | 2.1 | 5.0 | 1.8 | 0–2 | 0.65 | 0.90 | Poor |
| 10 | " | 5.0 | 2.8 | 2.1 | — | 1.8 | 0–2 | 0.65 | 0.85 | Excellent |
| 11 | " | 10.0 | 2.8 | — | 4.9 | 1.9 | 0–2 | 0.65 | 0.80 | Excellent |
| 12 | " | 20.0 | 2.9 | 2.2 | 5.0 | 2.0 | 0–2 | 0.68 | 0.75 | Excellent |
| 13 | " | 30.0 | 2.9 | 2.2 | 4.9 | 2.1 | 0.2 | 0.68 | 0.75 | Excellent |
| 14 | $MoS_2$ | 0.5 | 2.8 | 2.1 | 5.0 | 1.8 | 0–2 | 0.65 | 0.95 | Poor |
| 15 | " | 0.8 | 2.8 | — | 5.0 | 1.8 | 0–2 | 0.65 | 0.85 | Excellent |
| 16 | " | 1.0 | — | 2.1 | 5.0 | — | 0–2 | 0.65 | 0.75 | Excellent |
| 17 | " | 2.5 | 2.8 | — | 5.0 | 1.8 | — | 0.66 | 0.75 | Excellent |
| 18 | " | 5.0 | 2.9 | 2.2 | 4.9 | 2.1 | 0–2 | 0.68 | 0.78 | Excellent |

As can be clearly seen in Table 2, no lubrication effects as desired could be achieved when PTFE was used as a lubricant unless over 5 wt% was added. However, if the content of PTFE added exceeded 30 wt%, the fluidity of the material was reduced when molding was carried out. Thus when PTFE is added, the amount should be in the range between 5 and 30 wt%.

When $MoS_2$ is used as a filler, the content in the range between 1 and 5% is optimum.

EXAMPLE 2

In producing the plug 6, an epoxy resin was used as synthetic resin and glass beads of silica glass of a mean particle size of 10 μm were used as a filler. Tests were conducted in the same manner as described by referring to Example 1.

The results of the tests are shown in Table 3.

TABLE 3

| Specimen | Filler Kind | Filler Content (%) | Dimensional Accuracy (μm) Out of Roundness | Concentricity | Straightness | Surface Roughness | Spacing between Ends of Plug and Optical Fiber Mean Value | Spacing between Ends of Plug and Optical Fiber Variations | Connection Loss (dB) | Overall Results |
|---|---|---|---|---|---|---|---|---|---|---|
| D |  | 0 | 1.5 | 3.5 | 9.5 | 0.5 | 7.5 | 2–10 | 1.50 | Poor |
| 19 | Silica Glass | 10.5 | 1.4 | 3.3 | 9.0 | 0.5 | 4.0 | 2–7 | 1.15 | Poor |
| 20 | " | 21.0 | 1.3 | 3.2 | 8.2 | — | 3.8 | 2–6 | 1.10 | Poor |
| 21 | " | 27.8 | — | 3.0 | 6.6 | 0.5 | 3.5 | 2–6 | 1.10 | Poor |
| 22 | " | 29.5 | 1.2 | 2.5 | 5.5 | 0.6 | 2.0 | 1–3 | 0.70 | Excellent |
| 23 | " | 49.7 | 1.1 | 2.4 | — | 0.6 | 1.0 | 0–2 | 0.68 | Excellent |
| 24 | " | 69.5 | 1.2 | 2.2 | 2.0 | — | 0.6 | 0–1 | 0.60 | Excellent |
| 25 | " | 81.0 | — | 2.4 | 1.5 | 0.7 | 0.3 | 0–0.5 | 0.69 | Excellent |

Note:
D refers to the use of an epoxy resin alone.

As can be seen in Table 3, when the plug 6 is produced by using an epoxy resin, it is desirable that glass beads be added as a filler in 30–80 wt%. When the glass beads exceeded 81 wt% in amount, the fluidity of the resin was reduced at the time of molding operation, resulting in lowered molding characteristics of the resin.

It is believed that the need to use a large content of filler in combination with the use of an epoxy resin as a material for producing the plug 6 is accounted for by the essential difference in nature between polycarbonate and epoxy resin and the difference in fluidity (viscosity) existing at the time of molding operation.

The amount of the lubricant necessary for application to compensate for insertion and withdrawing of the plug 6 was the subject of study in the same manner as described by referrring to example 1.

The specimens used in the tests consisted of an epoxy resin added with silica glass in 69 wt%, and the lubricants included PTFE, $MoS_2$ and graphite.

The results are shown in Table 4.

TABLE 4

| Specimen | Filler Kind | Filler Content (%) | Out of Round-ness | Concen-tricity | Straightness | Surface Rough-ness | Variations Spacing between Ends of Plug and Optical Fiber | Connection Loss (dB) Initial Stage | Connection Loss (dB) After Insertion and Withdrawing | Overall Results |
|---|---|---|---|---|---|---|---|---|---|---|
| D |  | 0 | 1.5 | 3.5 | 9.5 | 0.5 | 2–10 | 1.50 | 1.80 | Poor |
| 26 | PTFE | 0.5 | 1.0 | 2.0 | 2.1 | 0.6 | 0–1 | 0.60 | 0.70 | Excellent |
| 27 | " | 1.0 | 2.0 | 2.0 | 2.0 | — | 0–1 | 0.60 | 0.68 | Excellent |
| 28 | " | 2.5 | — | 2.0 | 2.0 | 0.6 | 0–1 | 0.61 | 0.66 | Excellent |
| 29 | " | 5.0 | 1.1 | — | — | 0.6 | 0–1 | 0.65 | 0.70 | Excellent |
| 30 | $MoS_2$ | 1.0 | 1.0 | 2.0 | — | 0.6 | — | 0.64 | 0.68 | Excellent |
| 31 | " | 2.5 | 1.0 | — | 2.0 | — | 0–1 | 0.63 | 0.65 | Excellent |
| 32 | Graphite | 1.0 | 1.0 | 2.0 | 2.1 | 0.6 | 0–1 | 0.65 | 0.70 | Excellent |
| 33 | " | 2.5 | 1.0 | 2.0 | 2.2 | 0.6 | 0–1 | 0.66 | 0.71 | Excellent |
| 34 | " | 5.0 | 1.1 | 2.0 | 2.3 | 0.65 | 0–1 | 0.66 | 0.71 | Excellent |

As can be clearly seen in Table 4, it was possible to reduce the connection loss after insertion and withdrawing of the plug 6 when a lubricant was used. The amount of the lubricant added is preferably in the range between 1 and 5 wt% or achieving best lubrication effects and obtaining optimum formability.

Figure 5:
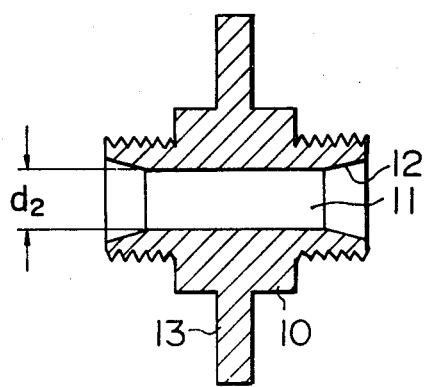
FIG. 5 is a sectional view of the sleeve.

In order to minimize the connection loss, it is essential that the outer diameter $D_1$ (FIG. 4) of the optical fiber 2 of the optical fiber cable 1 and the inner diameter $d_1$ (FIG. 3) of the orifice 8 of the plug 6 and the outer diameter $D_2$ (FIG. 3) of the forward end portion of the plug 6 and the inner diameter $d_2$ (FIG. 5) of the through hole 11 of the sleeve 10 be controlled.

First of all, in order to align the center axis of the optical fiber 2 with the center axis of the orifice 8 of the plug 6, the inner diameter $d_1$ of the orifice 8 has only to be made equal to the outer diameter $D_1$ of the optical fiber 2. However, if the inner diameter $d_1$ of the orifice 8 were equal to the outer diameter $D_1$ of the optical fiber 2, difficulties would be experienced in passing the optical fiber 2 through the orifice 8 and in addition no gaps would be formed between the orifice 8 and optical fiber 2 for admitting the adhesive agent thereinto. Meanwhile if the diameter $d_1$ were larger than the outer diameter $D_1$ of the optical fiber 2, eccentricity of the axes of the orifice 8 and the conductor 2 would become great. To overcome these difficulties, the inner diameter $d_1$ of the orifice 8 should be larger than the outer diameter $D_1$ of the optical fiber 2 by 1–2 μm. This facilitates insertion of the optical fiber 2 in the orifice 8 and makes it possible to restrict the eccentricity of the orifice 8 and optical conductor 2 to 0.5–1 μm, in addition to facilitating admission of the adhesive agent between the optical fiber 2 and orifice 8 to achieve bonding between them.

Figure 6:
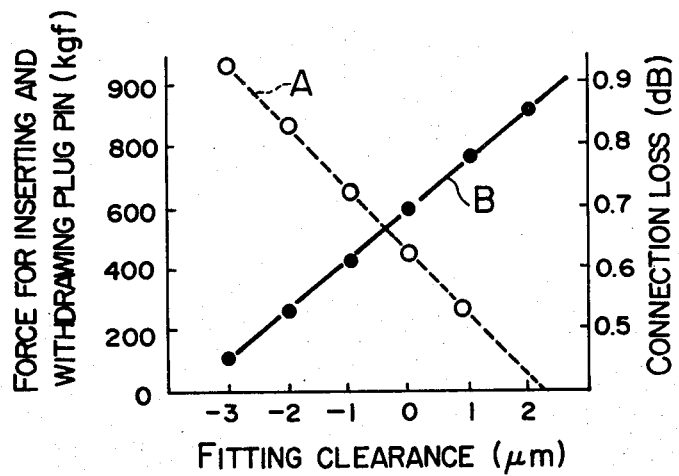
FIG. 6 is a characteristic diagram showing the clearance provided in fitting the plug to the sleeve in relation to the force with which the plug is inserted and withdrawn and the connection loss.

The outer diameter $D_2$ of the plug 6 and the inner diameter $d_2$ of the sleeve 10 are decided by the force exerted for inserting and withdrawing the plug 6 and the connection loss. For example, FIG. 6 shows the force for inserting and withdrawing the plug 6 with respect to the sleeve 10 in relation to the connection loss, it being assumed that the difference ($D_2-d_2$) between the outer diameter $D_2$ of the plug 6 and the inner diameter $d_2$ of the sleeve 10 provides a clearance necessary for fitting the plug 6 in the sleeve 10. In FIG. 6 in which A represents the insertion and withdrawing force and B indicates the connection loss, the plug 6 and the sleeve 10 used in combination were molded of an epoxy resin added with 69% of filler. When the fitting clearance is in the region (−), it is indicated that the plug 6 is force fitted in the sleeve 10, and the insertion and withdrawing force is high while the connection loss is small. On the other hand, when the fitting clearance is in the region (+), it will be seen that although the insertion and withdrawing force is low the connection loss is great.

Figure 7:
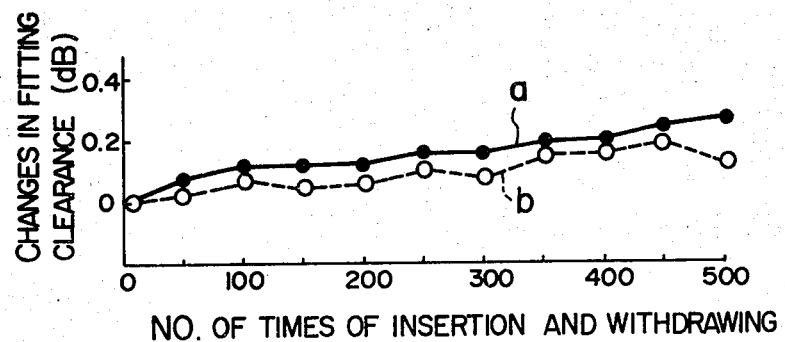
FIG. 7 is a characteristic diagram showing the number of times the plug is inserted and withdrawn in relation to the connection loss.

FIG. 7 shows the number of times the plug is inserted and withdrawn in relation to changes in fitting clearance, which FIG. 6 shows is directly proportional to the connection loss. In FIG. 7, a represents the case where the fitting clearance is initially −3 μm, and b indicates the situation where the initial fitting clearance is −2 μm. As can be clearly seen in FIG. 6, the greater the fitting clearance in the (−) region, the higher the frictional force acting between the plug 6 and the sleeve 10. This causes greater wear on the parts when the plug 6 is inserted or withdrawn, as reflected in FIG. 7, so that the connection loss will show larger changes.

In view of the foregoing, it would be possible to keep the connection loss including the influences of insertion and withdrawing of the plug 6 to a level below 1 dB if the fitting clearance of the plug 6 in the sleeve 10 were set in the range between −3 and +2 μm.

Figure 8:
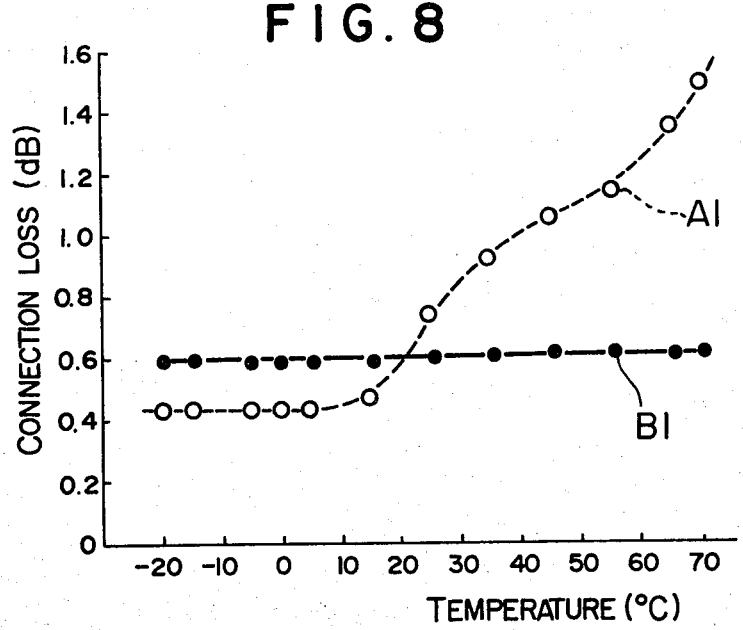
FIG. 8 is a characteristic diagram showing the temperature decided by the selected material for molding the plug and the sleeve in relation to the connection loss.

FIG. 8 shows the influence exerted by the combination of the plug 6 and the sleeve 10 on connection losses. In FIG. 8, A1 represents the sleeve 10 formed of an epoxy resin and the plug 6 of polycarbonate and B1 represents the plug 6 and sleeve 10 both formed of an epoxy resin (the fitting clearance is 0 when the temperature is 22 degrees). As can be clearly seen in the figure, the influences of the temperature can be eliminated if the same material is used. Thus the plug 6 and the sleeve 10 are preferably formed of the same material.

An adhesive agent of low viscosity (below 20 poise) is used as an adhesive agent. By adding a filler to the adhesive agent, it is possible to reduce the eccentricity of the center axis of the optical fiber 2 of the optical fiber cable 1 with respect to the center axis of the orifice 8 of the plug 6. For example, alumina powder of an average particle size of 0.3 μm may be added as a filler in 40-60 wt% to the adhesive agent when $d_1 = D_1 + 1$ μm. This gives a uniform distribution of the filler between the orifice 8 and the optical fiber 2, so that the eccentricity of the optical fiber 2 with respect to the orifice 8 can be reduced to a level below 0.2 μm at a maximum. The mean particle size of the filler is about 50-70% of the clearance between the orifice 8 and the optical fiber 2. A suitable material should be selected for the filler.

Figure 9:
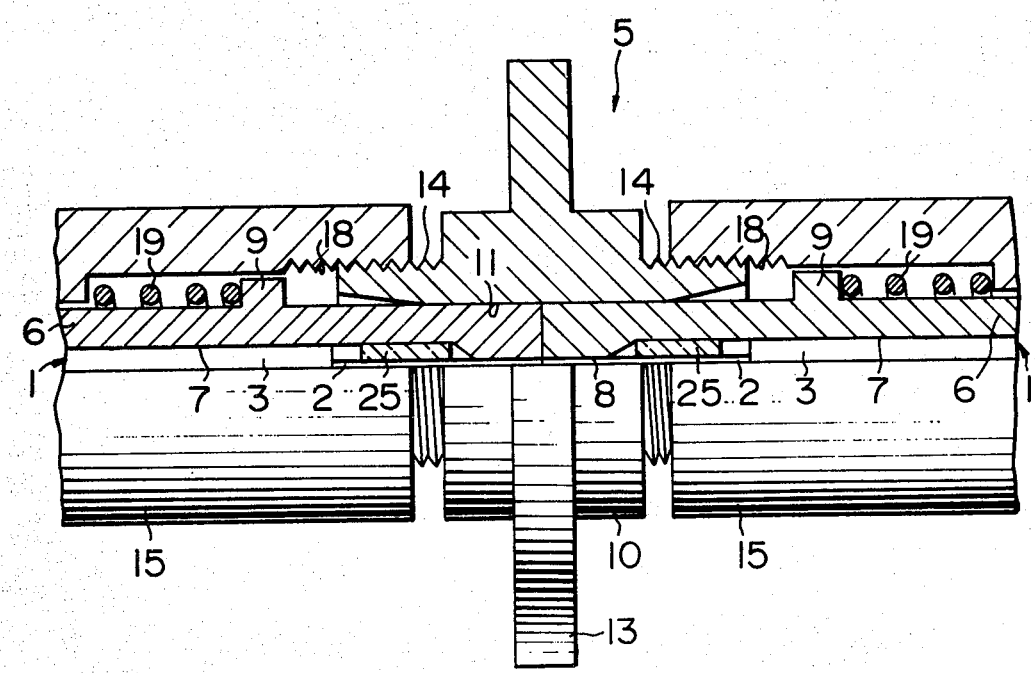
FIG. 9 is a view, on an enlarged scale, showing the optical fiber connector comprising another embodiment.

FIG. 9 shows another embodiment of the invention wherein parts similar to those shown in FIG. 1 are designated by like reference characters. A glass pipe 25 is attached to the optical fiber 2 of the optical fiber cable 1 and inserted in the bore 7 of the plug 6 where it is adhesively bonded to the plug pin 6 and the optical fiber 2.

This construction adapts the optical fiber connector according to the invention to applications in which the connector is installed in places of large variations in temperature where the connector is subjected to repeated heating and cooling, for a monitoring system for the piping or processing devices of chemical plants or a data transmission system built in the rolling mill of a steel making plant, for example.

More specifically, when the optical fiber connector 5 is subjected to repeated heating and cooling at a temperature of 100 degrees or thereabout, the difference in thermal expansion between the optical fiber 2 of the optical fiber cable 1 and the plug 6 and the adhesive agent causes peeling of the adhesive agent, and when the adhesive agent is pushed out of the forward end of the plug 6 by thermal expansion, the optical fiber 2 is simultaneously pushed out. This reduces the reliability of the optical fiber connector 5 used in transmission of information.

This disadvantage can be eliminated by using the glass pipe 25, because the optical fiber 2 is restrained by the glass pipe 25 and prevented from sticking out of the plug 6 even if subjected to repeated heating and cooling.

What is claimed is:

1. An optical fiber connector comprising a pair of plug pins, a sleeve having a forward end of each said plug pin inserted therein to bring the end portions of the plug pins into abutting engagment with each other, and a pair of cap nuts for securing said plug pins to said sleeve, said plug pins, sleeve and cap nuts being formed of synthetic resinous material and each of said plug pins being attached to an end of a respective optical fiber by means of an adhesive agent, each of said plug pins having an orifice, formed by a core pin having a diameter 1-2 μm larger than the outer diameter of the optical fiber, and being located in the center of a core for forming a forward end face of the plug pin, wherein the adhesive agent comprises an epoxy resin base adhesive agent of below 20 poise in viscosity added as a filler with 40-60 wt% of alumina or aluminum hydroxide in particle form of mean particle size which is 50-70% of the clearance between an orifice of th plug and the optical fiber.

2. An optical fiber connector of the type capable of assembly at a site of installation thereof, comprising:
   a pair of plug pins formed of synthetic resinous material, a forward end portion of each plug pin having an orifice in an end face thereof for receiving an end of an optical fiber;
   a sleeve formed of synthetic resinous material, said sleeve being constructed for receiving the forward end portion of both of said plug pins inserted therein so as to bring the end faces thereof into abutting engagement with each other;
   wherein said orifice is concentrically positioned in the end face of each plug pin and is larger than the outer diameter of said end of the optical fiber by 1-2 μm as a result of each plug pin having been fabricated by using a metal mold having a core pin for forming said orifice that is located in the center of a core for forming the forward end face of the plug pin, said core pin being 1-2 μm larger in diameter than said outer diameter of the end of the optical fiber; and
   wherein each of said plug pins is attached to an optical fiber by means of an adhesive agent which comprises an epoxy resin base adhesive agent of below 20 poise in viscosity added as a filler with 40-60 wt% of alumina or aluminum hydroxide in particle form of mean particle size which is 50-70% of the clearance between an orifice of the plug and the optical fiber.

3. An optical fiber connector as claimed in claim 2, wherein the synthetic resin compositon molding said plug pins and said sleeve comprises polycarbonate, and a material selected from the group consisting of one of glass beads, glass bulbs and silica glass in particle form added to the polycarbonate in 10-30 wt% as a filler.

4. An optical fiber connector as claimed in claim 3, wherein the composition for molding the plug pins and the sleeve is added with 5-30 wt% of polytetrafluoroethylene as a lubricant.

5. An optical fiber connector as claimed in claim 3, wherein the composition for molding the plug pins and the sleeve is added with 1-5 wt% of molybdenum disulfide as a lubricant.

6. An optical fiber connector as claimed in claim 2, wherein the synthetic resin composition molding said plug pins and said sleeve comprises an epoxy resin, and a material selected from the group consisting of one of glass beads, glass bulbs and silica glass in particle form added to the epoxy resin in 30-80 wt%.

7. An optical fiber connector as claimed in claim 2, wherein the difference between an outer diameter of said plug pins and an inner diameter of said sleeve is from −3 to +2 μm.

8. An optical fiber connector as claimed in claim 2, wherein a glass pipe is attached to the optical fiber and inserted together with the optical fiber into the plug, to thereby affix the glass pipe to the plug together with the optical fiber.

9. An optical fiber connector as claimed in claim 6, wherein the composition for molding the plug pins and the sleeve is added with 1-5 wt% of one of polytetrafluoroethylene, molybdenum disulfide and graphite as a lubricant.

* * * * *